United States Patent

[11] 3,611,084

| [72] | Inventor | George C. Kent<br>Lake Oswego, Oreg. |
|---|---|---|
| [21] | Appl. No. | 888,736 |
| [22] | Filed | Dec. 29, 1969 |
| [45] | Patented | Oct. 5, 1971 |
| [73] | Assignee | GAF Corporation<br>New York, N.Y. |

[54] SELECTIVE CYCLE MOTOR WINDING FOR MOVIE PROJECTOR
2 Claims, 2 Drawing Figs.

[52] U.S. Cl. ................................................. 318/225 R,
318/220 R, 318/440, 307/73
[51] Int. Cl. ............................................. H02p 5/28
[50] Field of Search ........................................... 318/105,
110, 197, 220, 225, 231, 432, 440, 503, 531;
307/73, 129

[56] References Cited
UNITED STATES PATENTS

| 2,466,900 | 4/1949 | Knopp | 318/225 |
| 2,543,131 | 2/1951 | Seifried | 318/225 |
| 2,613,343 | 10/1952 | Ober | 318/225 |
| 3,140,637 | 7/1964 | Frenk et al. | 318/225 X |

Primary Examiner—Gene Z. Rubinson
Attorney—McDougall, Hersh & Scott

ABSTRACT: This application discloses a motion picture projector driven by an alternating current motor. The motor by manipulation of a switch altering the effective number of turns in the field winding can operate at different frequencies without undesirable variations in speed, torque and temperature.

PATENTED OCT 5 1971 3,611,084

INVENTOR
George C. Kent
by McDougall, Hersh and Scott Attys

SELECTIVE CYCLE MOTOR WINDING FOR MOVIE PROJECTOR

BACKGROUND OF THE INVENTION

The electric power supplied throughout the world varies in frequency and voltage. However, insofar as frequency is concerned, the two most common are 50 hertz and 60 hertz. This situation creates problems when it is desired to operate devices driven by alternating current motors which have a number of parameters such as speed, torque and operating temperatures which vary directly with the frequency of supply voltage. One device in particular in which this problem arises is the motion picture projector. Such devices are sold in very competitive markets and are frequently manufactured in one country for sale and use throughout the world. Therefore, it becomes desirable to provide such projectors with means whereby they can be operated at different frequencies and it is equally desirable to provide such a capability without excessively complicated elements and consequently substantial increase in cost.

While there have been prior art attempts to provide motion picture projectors with the ability to operate with different supply frequencies they have been relatively complicated and expensive. For instance, it has been proposed to utilize a transformer interposed between the motor windings and the supply which may be variously tapped to accommodate different supply voltages and frequencies. This approach requires the use of a transformer and a relatively complicated switching arrangement. Its complexity creates cost and reliability problems that militate against wide acceptance.

Therefore, it is an object of this invention to provide a novel motion picture projector which may be operated with supply voltage of different frequencies which by virtue of its simple construction is economical and reliable.

It is another object of this invention to provide a novel motion picture projector which may be selectively operated with supply voltages of different frequencies by the manipulation of simple switch means.

SUMMARY OF THE INVENTION

The above and other objects of the invention are achieved by the provision of a motor in a motion picture projector which is provided with a field winding providing a plurality of taps which may be selectively connected to a supply source by switch means so as to maintain substantially constant its torque and operating temperature regardless of the frequency supplied.

BRIEF DESCRIPTION OF THE DRAWINGS

The invention is set forth in the claims while the structure and mode of operation of an embodiment thereof may be understood by reference to the detailed description taken in conjunction with the accompanying drawings in which:

DETAILED DESCRIPTION

Figure 1:
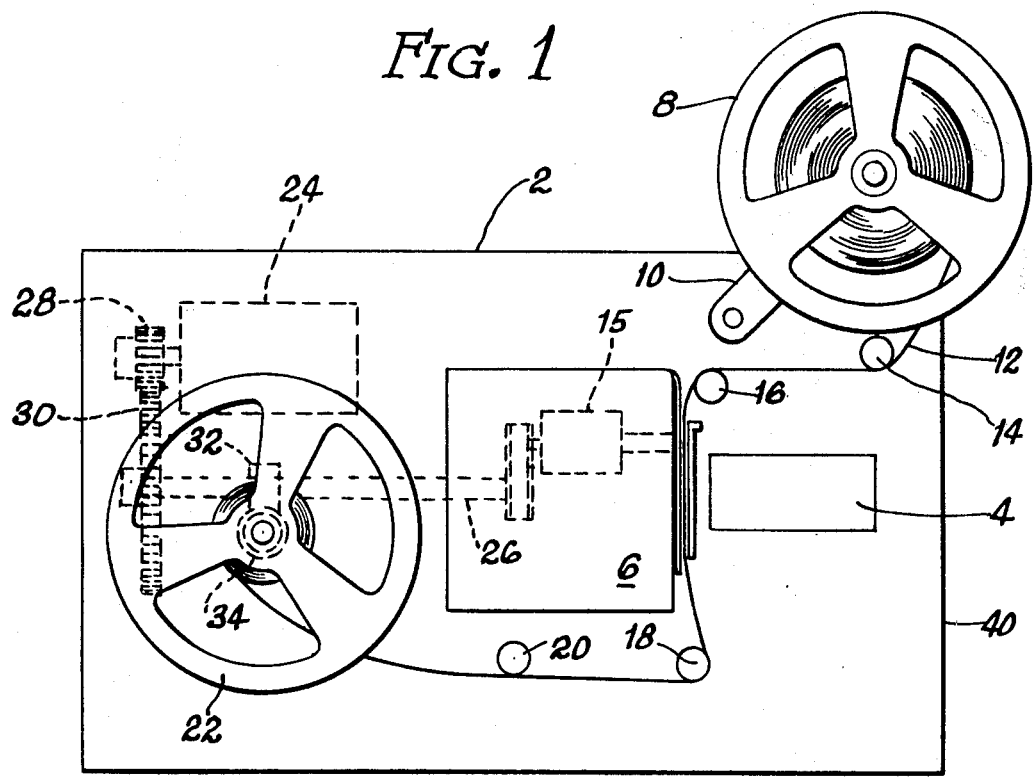
FIG. 1 is a side elevation schematically illustrating a projector in accordance with the invention.

A motion picture projector as illustrated in FIG. 1 is provided with a casing 2. The illustration of FIG. 1 shows in a rudimentary fashion the elements of a motion picture projector in accordance with the invention. A more specific disclosure of a projector of the type involved may be had by reference to application Ser. No. 619,992 filed Mar. 2, 1967 in the name of A. V. Procop for "Film Handling Mechanism For A Motion Picture Projector." Mounted in the casing is a lens 4 positioned to the front of a lamp 6 likewise mounted in the casing. A delivery reel 8 is supported by a bracket 10 on the casing and film 12 is fed around guides 14 and 16 to pass into a drive and framing assembly 15 vertically between the lens 4 and 6. Additional guides 18 and 20 carry the film to be wound on a takeup reel 22. A motor 24 mounted in the casing is connected by suitable transmission means to a driven shaft 26 to effect its rotation. In the embodiment illustrated, the transmission means is constituted by a pinion gear 28, on the end of the shaft of the motor 24, engaging a driving gear 30 on the end of shaft 26. Other arrangements such as a belt and pulley may be used. A first worm gear 32 on the shaft engages and drives a gear 34 coupled to the shaft supporting the takeup reel so as to cause rotation of the takeup reel. A second pulley 36 rotatable with the shaft 26 drives a belt 38 engaging a driven pulley 40 providing the driving energy for the drive and framing assembly 15. Upon the energization of the motor and the resulting rotation of the shaft 26, the film will be delivered from the reel 8, projected and wound on takeup reel 22.

In order to project motion pictures from the type of projector described in a manner which is related to the rate at which the frames were exposed and to create the effect desired a range of image frequencies have been found to be acceptable. For instance, in a very commonly used system the rate may vary between 16 and 20 frames per second and still be acceptable. In view of this, it is possible to provide a drive motor the speed of which may vary slightly as the supply frequency changes but the change in the rate at which frames are projected will still be within the acceptable range. Therefore, when a system is provided for operation at 60 hertz and it is supplied with 50 hertz there will be a slight speed reduction but it will not be objectionable.

The problem arises, however, because the motor has an impedance which consists essentially of inductive reactance which decreases as the frequency decreases. A decrease in inductive reactance therefore results in greater current flow through the motor winding. With greater current flow there is a greater heat rise. Likewise, the torque of the motor is directly related to increase in power and inversely related to speed. Power is function of a current so that with the current increase and the speed decrease, which occurs when the applied frequency is reduced, torque and motor temperature will both increase. The problem is aggravated when a projection built for operation at 60 hertz 110–120 volts is used in an area where the frequency of the supply is not only less but where the regulation is poor so that its voltage may be at times substantially higher, that is, up to 130–135 volts.

Figure 2:
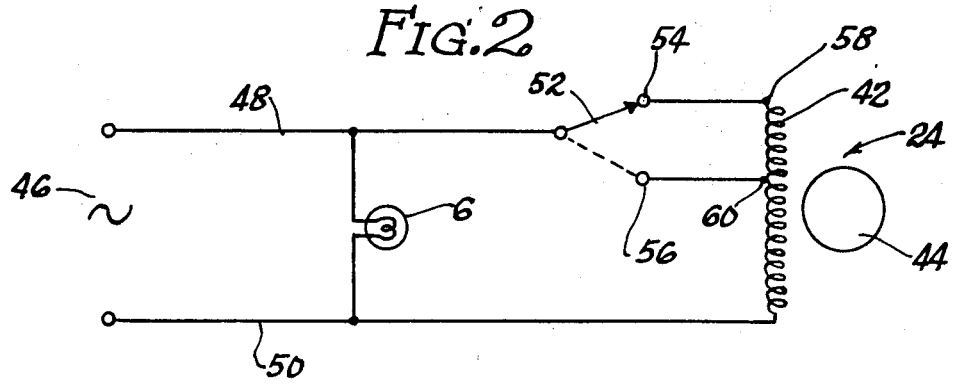
FIG. 2 is a schematic diagram of an electrical circuit in accordance with the invention.

Accordingly, this invention includes a motor circuit as shown in FIG. 2. The motor 24 is a single-phase shaded-pole motor having a field winding 42 and a rotor 44. The winding 42 is supplied from an AC source 46 via a pair of conductors 48 and 50. The lamp 6 may be connected across the conductors and energized with the motor. A single-pole double-throw switch 52 has one terminal connected to the conductor 48 while its other two terminals 54 and 56 are connected to points or taps 58 and 60 on the winding 42.

The operation of this embodiment of the invention is as follows. When the switch is connected to the terminal 56 and tap 60 that much of the winding 42 between the tap 60 and the end connected to the conductor 50 is included in the circuit. This mode may be that for operation at 60 hertz and the design parameters determined on this basis. If it is desired to operate the projector at 50 hertz, the switch 52 may be moved to terminal 54 connecting all of winding 42 between point 58 and conductor 50 in the circuit. Thus, even though there may be a drop in the inductive impedance of the winding between 60 hertz and 50 hertz due to operation at the lower frequency the total impedance of the circuit will remain substantially the same because the additional winding segment between 60 and 58 has been added to the circuit. Consequently, the current will not tend to increase significantly and therefore the rise in temperature and torque if present will not be significant.

By way of illustration a shaded-pole single-phase motor designed to have 12 inch-ounces of running torque and operate at 120 volts when provided with a winding having 440 effective turns for 60 hertz operation had 530 effective turns for 50 hertz operation. The temperature rise and change in torque are negligible when the motor is operated at the lower frequency.

While the invention has been described in connection with a particular embodiment thereof, it is intended by the appended claims to cover all variations thereof which come within the scope of the disclosure and the appended claims.

I claim:

1. In a motion picture projector having a lamp, a lens, a delivery reel, a takeup reel and guide means over which film may be trained between said lamp and said lens from said delivery to said takeup reel, and drive means for said takeup reel; the improvement comprising an electric motor, transmission means connecting said motor and said drive means, said motor having a winding, means for connecting said winding to a source of alternating current supply, including a plurality of taps connected to said winding and switch means for selectively connecting one side of the source to one of said tapes and a conductor for connecting an end of said winding spaced from said taps to the other side of said source for varying the effective turns in said winding as the supply frequency changes whereby the impedance of said winding is maintained substantially constant in spite of changes in the frequency of the supply voltage.

2. In the motion picture projector of claim 1 wherein said winding has a first tap intermediate its length for operation at first supply frequency and a second tap at one end thereof for operation at a second and lower frequency.

PO-1050
(5/69)

UNITED STATES PATENT OFFICE
CERTIFICATE OF CORRECTION

Patent No. 3,611,084      Dated     October 5, 1971

Inventor(s) George C. Kent

It is certified that error appears in the above-identified patent and that said Letters Patent are hereby corrected as shown below:

Column 4, line 2 "tapes" should read "taps".

Signed and sealed this 4th day of April 1972.

(SEAL)
Attest:

EDWARD M. FLETCHER, JR.      ROBERT GOTTSCHALK
Attesting Officer      Commissioner of Patents